United States Patent
Lee

(10) Patent No.: US 8,130,563 B2
(45) Date of Patent: Mar. 6, 2012

(54) COMPUTER APPARATUS AND MEMORY ERROR SIGNAL DETECTING SYSTEM

(75) Inventor: Tsung-Hsi Lee, Taipei (TW)

(73) Assignee: Inventec Corporation, Taipei (TW)

( * ) Notice: Subject to any disclaimer, the term of this patent is extended or adjusted under 35 U.S.C. 154(b) by 197 days.

(21) Appl. No.: 12/759,345

(22) Filed: Apr. 13, 2010

(65) Prior Publication Data

US 2011/0116325 A1      May 19, 2011

(30) Foreign Application Priority Data

Nov. 18, 2009    (TW) .............................. 98139201 A

(51) Int. Cl.
*G11C 7/10*    (2006.01)
(52) U.S. Cl. .............. 365/189.05; 365/189.08; 365/191; 323/271
(58) Field of Classification Search ............. 365/189.05, 365/189.08, 191, 226; 323/271
See application file for complete search history.

(56) References Cited

U.S. PATENT DOCUMENTS

| | | | |
|---|---|---|---|
| 7,848,169 B2 * | 12/2010 | Shikata | 365/226 |
| 2008/0198636 A1 * | 8/2008 | Yang et al. | 363/41 |
| 2009/0224732 A1 * | 9/2009 | Kudo et al. | 323/271 |

* cited by examiner

Primary Examiner — Tuan T Nguyen
Assistant Examiner — Toan Le
(74) Attorney, Agent, or Firm — J.C. Patents

(57) ABSTRACT

A memory error signal detecting system including a signal extracting circuit, a flip-flop, a latch circuit, and a light sign is provided. The signal extracting circuit receives a memory error signal to output a pulse signal when the memory error signal switches from a first level to a second level. When the preset end of the flip-flop receives the pulse signal, and the maintaining time of the pulse signal is maintained for a predetermine time, the flip-flop output end is set to a high voltage level. The latch circuit determines whether to output the state of the flip-flop output according to the reset signal. The light sign operates according to the state of an output end of the latch circuit. Furthermore, a computer apparatus including the memory error signal detecting system is also provided.

13 Claims, 3 Drawing Sheets

COMPUTER APPARATUS AND MEMORY ERROR SIGNAL DETECTING SYSTEM

CROSS-REFERENCE TO RELATED APPLICATION

This application claims the priority benefit of Taiwan application serial no. 98139201, filed on Nov. 18, 2009. The entirety of the above-mentioned patent application is hereby incorporated by reference herein and made a part of this specification.

BACKGROUND OF THE INVENTION

1. Field of the Invention

The invention relates to a signal detecting system, and particularly to a memory error signal detecting system used in a computer apparatus.

2. Description of Related Art

When the server is tested, it is required for the operator to rely on the error log generated by the board management controller (BMC) to find the reason why the server can not operate normally Among a plurality of issues causing the server can not operate normally, one of the issues is that uncorrected memory errors occur in the memory, and when accumulated times that the uncorrected memory errors occur in the memory achieve to a predetermined value, the server can be restarted.

FIG. 1 is a schematic system block diagram of a conventional computer apparatus. Referring to FIG. 1, it simply shows the relationship of the central processing unit (CPU) 102 and the memory 104. When the CPU 102 reads the data stored in the memory 104, if uncorrected memory errors are found, the counter inside the CPU 102 will start to count the accumulated times that the uncorrected memory errors occur in the memory. When the accumulated times are equal to a predetermined value, the CPU 102 will pull a memory error signal CATERR down to a low voltage level from a high voltage level, and also pull a reset signal RST down to the low voltage level to restart the server.

Accordingly, in the conventional technology, if the operator wants to know whether restarting the server is due to too many uncorrected memory errors occurring in the memory, the operator can record the state of the memory error signal CATERR. In other words, if the server is restarted, and it is also found that the memory error signal CATERR is pulled down to the low voltage level in the BMC's error log, the operator will determine that this error is due to too many uncorrected memory errors occurring in the memory 104.

However, in the conventional technology, the determination is not exact. As shown in FIG. 1, a DC voltage VDD biases the memory error signal CATERR through the resistor 106. In other words, when the CPU 102 pulls the reset signal down to the low voltage level, thereby restarting the server, the DC voltage VDD also is turned off. At this time, the memory error signal CATERR is pulled down to the low voltage level. Accordingly, if the operator determines that whether too many uncorrected memory errors occur in the memory 104 simply based on that whether the memory error signal CATERR is pulled down to the low voltage level when the server is restarted, it is not exact. The operator can not confirm that the memory error signal CATERR pulled down to the low voltage level is due to the server restarted or too many uncorrected memory errors occurring in the memory 104. Accordingly, it will trouble the operator when he or she debugs the server. Taiwan patent number 1300654, filed on Jan. 4, 2006, disclosed a pulse single detection device.

SUMMARY OF THE INVENTION

Accordingly, an embodiment of the invention provides a memory error signal detecting system capable of finding the reason why the memory error signal is lowered to the low voltage level.

An embodiment of the invention provides a computer apparatus. When the computer apparatus is detected, if it can not operate normally, the computer apparatus is able to provide relatively true information to the operator, so that the operator can debug conveniently.

An embodiment of the invention provides a memory error signal detecting system including a signal extracting circuit, a flip-flop, a latch circuit, and a light sign. The signal extracting circuit receives a memory error signal to output a pulse signal to the flip-flop when the memory error signal switches from a first level to a second level. The flip-flop has a preset end, a clear end, and a flip-flop output end. Herein, the preset end is coupled to an output end of the signal extracting circuit. Accordingly, when the preset end receives the pulse signal, and a maintaining time of the pulse signal is maintained for a predetermined time, the flip-flop output end is set to a high voltage level. Furthermore, the clear end of the flip-flop receives a reset signal, and the flip-flop output end is coupled to the latch circuit. Accordingly, the latch circuit determines whether to output a state of the flip-flop output to the light sign according to the reset signal.

According to another aspect of the invention, an embodiment of the present invention also provides a computer apparatus, which includes a memory and a central processing unit (CPU). Herein, when accessing the data stored in the memory, and finding that accumulated times of uncorrected memory errors achieve a predetermined value, the CPU switches a memory error signal from a first level to a second level and switches a reset signal from a third level to a fourth level to restart the computer apparatus. Furthermore, a signal extracting circuit is coupled to the CPU and receives a memory error signal to output a pulse signal to a flip-flop when the memory error signal switches from the first level to the second level. The flip-flop has a preset end, a clear end, and a flip-flop output end. Herein, the preset end of the flip-flop is coupled to an output end of the signal extracting circuit so that when the preset end receives the pulse signal, and a maintaining time of the pulse signal is maintained for a predetermined time, the flip-flop output end is set to a high voltage level, and the clear end receives the above reset signal. Furthermore, the latch circuit is coupled to the flip-flop output end, and when the reset signal switches from the third level to the fourth level, the latch circuit outputs a state of the flip-flop output end to a light sign to determine whether to turn on the light sign.

In an embodiment of the invention, the signal extracting circuit includes a first inverter, a second inverter, and an AND gate. The first inverter can receive the memory error signal, and an output end of the first inverter can be coupled to an input end of the second inverter and a first input end of the AND gate. Furthermore, the output end of the second inverter can be coupled to a second input end of the AND gate through a resistor, and the second input end thereof can be grounded through a capacitor. An output end of the AND gate can be coupled to the preset end of the flip-flop to output the pulse signal to the flip-flop when the first and the second input ends are at the high voltage level simultaneously during a time period.

The signal extracting circuit in the embodiment of the invention can output the pulse signal to the preset end of the flip-flop when the accumulated times of uncorrected memory errors occurring in the memory achieve the predetermined value, so that the memory error signal switches from the first level to the second level, and when the time of second level achieve the predetermined time. Furthermore, the latch circuit in the embodiment of the invention can determine whether to output the state of the flip-flop output to the light sign according to the reset signal. Accordingly, the embodiment of the invention can provide true error information to the operator, so that when debugging the computer apparatus, the operator can confirm whether the error is caused due to too many uncorrected memory errors occurring in the memory.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
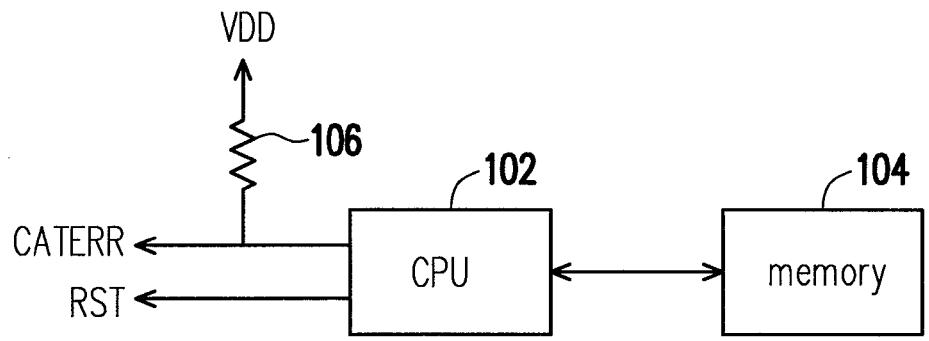
FIG. 1 is a schematic system block diagram of a conventional computer apparatus.
Figure 2:
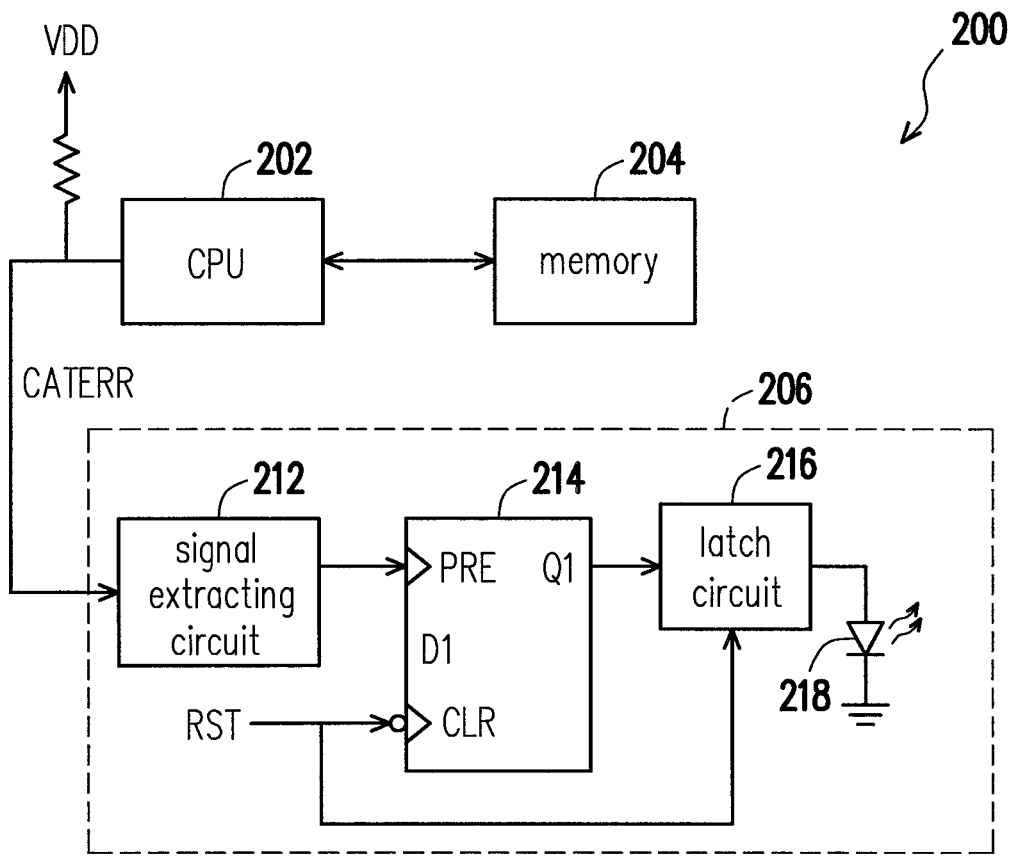
FIG. 2 is a schematic system block diagram of a computer apparatus according to an embodiment of the invention.

FIG. 2 is a schematic system block diagram of a computer apparatus according to an embodiment of the invention. Referring to FIG. 2, a part of circuit, such as a central processing unit (CPU) 202, a memory 204, and a detecting system 206, is shown in the computer apparatus 200 provided in the present embodiment. Herein, the memory 204, for example, is a double-data-rate (DDR) dynamic random access memory (DRAM).

The detecting system 206 includes a signal extracting circuit 212, a flip-flop 214, a latch circuit 216, and a light sign 218. Herein, the signal extracting circuit 212 is coupled to the CPU 202 and the flip-flop 214. The flip-flop 214, for example, is a D flip-flop, which has a preset end PRE, a clear end CLR, a flip-flop input end D1, and a flip-flop output end Q1. In the present embodiment, the preset end PRE of the flip-flop 214 is coupled to the signal extracting circuit 212, and the clear end CLR is coupled to a reset signal RST. In addition, the flip-flop output end Q1 is coupled to the latch circuit 216.

Besides being coupled to the flip-flop output end Q1, the latch circuit 216 also can be coupled to the reset signal RST. Moreover, the latch circuit 216 is further coupled to the light sign 218. In the present embodiment, the light sign 218 can be implemented by using a light emitting diode, of which the positive end is coupled to the output end of the latch circuit 216, and the negative end is grounded.

In following, different conditions will be described to illustrate the operation of the detecting system 206 in the present embodiment.

Figure 3:
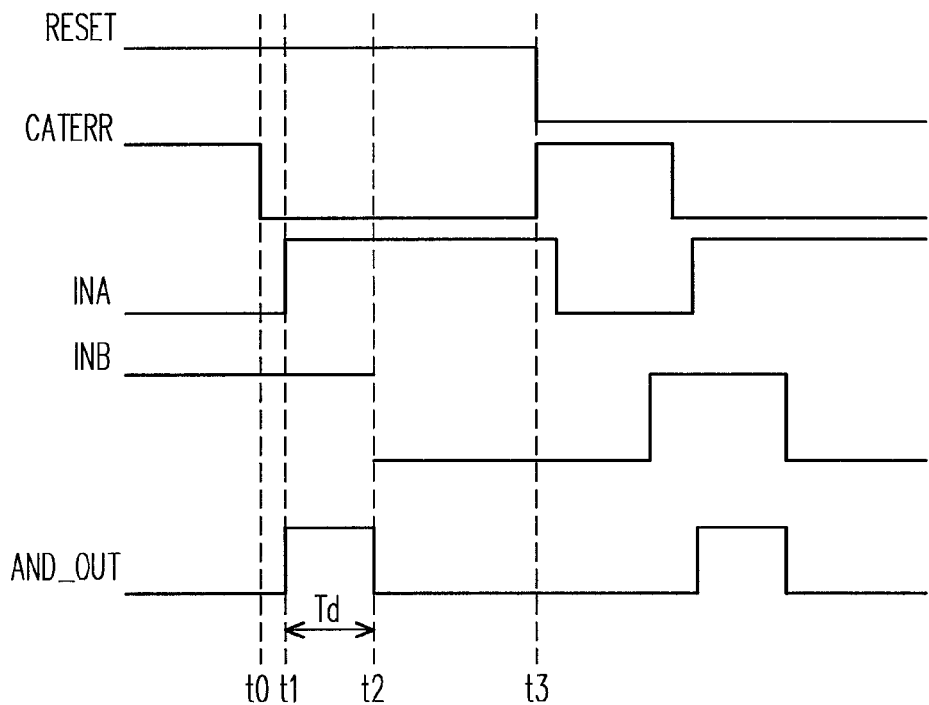
FIG. 3 shows timing diagrams of signals in FIG. 2 according to an embodiment of the invention.

FIG. 3 shows timing diagrams of signals in FIG. 2 according to an embodiment of the invention. Referring to FIG. 2 and FIG. 3, when the CPU 202 accesses the data stored in the memory 204 and finds that the memory 204 has uncorrected memory errors, and the accumulated times thereof have achieved a predetermined value, the CPU 202 switches a memory error signal CATERR from a first level to a second level in the time t0 as shown in FIG. 3. In the present embodiment, the memory error signal CATERR is biased by a DC voltage VDD. Particularly, the memory error signal CATERR of the present embodiment is transmitted to the signal extracting circuit 212 by the CPU 202.

Figure 4:
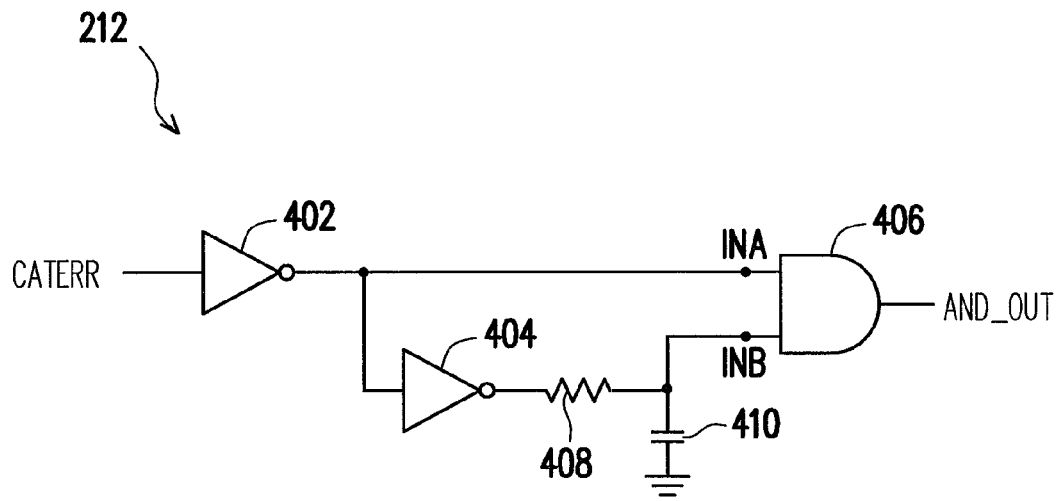
FIG. 4 is a circuit diagram of a signal extracting circuit according to an embodiment of the invention.

FIG. 4 is a circuit diagram of a signal extracting circuit according to an embodiment of the invention. Referring to FIG. 4, the signal extracting circuit 212 includes a first inverter 402, a second inverter 404, and an AND gate 406. The input end of the first inverter 402 receives the memory error signal CATERR, and an output end of the first inverter 402 is coupled to a first input end INA of the AND gate 406 and an input end of the second inverter 404. Furthermore, the output end of the second inverter 404 is coupled to a first end of a resistor 408, and a second end of the resistor 408 is coupled a second input end INB of the AND gate 406. Besides, the second input end INB thereof is grounded through a capacitor 410.

Referring to FIG. 3 and FIG. 4, in the present embodiment, the first level of the memory error signal CATERR is higher than the second level thereof. Accordingly, after the memory error signal CATERR is switched to the second level at time t0, the first inverter 402 can pull the first input end INA up to the high voltage level at time t1. At this time, the second input end INB is maintained in an initial state thereof, i.e. the high voltage level.

Next, at time t2, the second inverter 404 pulls the second input end INB down to the low voltage level. Accordingly, the input ends INA and INB are both at the high voltage level during the period from time t1 to time t2. At this time, the output end AND_OUT of the AND gate 406 can be switched to the high voltage level during the period from time t1 to time t2, and switched back to the low voltage level after the time t2. According to another aspect, the output end AND_OUT of the AND gate 406 can output a pulse signal which has a maintaining time Td, and the period thereof is the period from time t1 to time t2.

Referring to FIG. 2 and FIG. 3, when the flip-flop 214 receives the pulse signal outputted by the signal extracting circuit 212 from the preset end PRE, the flip-flop 214 can first determine whether the maintaining time Td of the pulse signal achieves to a predetermined time. If the memory error signal CATERR switches from the first level to the second level due to the noise interference, the maintaining time Td of the pulse signal is very short and can not achieve to the predetermined time. Under this condition, the flip-flop 214 does not operate any further. On the contrary, if the memory error signal CATERR is switched to the second level by the CPU 202, the maintaining time Td can achieve to the predetermined time. At this time, the flip-flop 214 sets the flip-flop output end Q1 to the high voltage level, and the state of the flip-flop output end Q1 is latched in the latch circuit 216.

Figure 5:
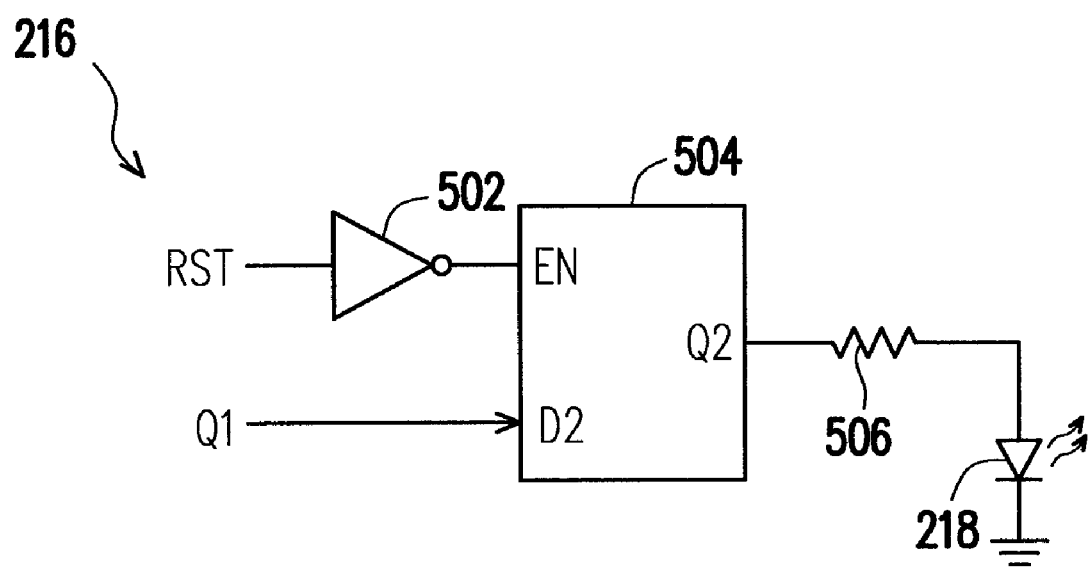
FIG. 5 is a circuit diagram of a latch circuit according to an embodiment of the invention.

FIG. 5 is a circuit diagram of a latch circuit according to an embodiment of the invention. Referring to FIG. 2 and FIG. 5, the latch circuit 216 includes a third inverter 502 and a latch 504. Herein, the third inverter 502 receives the reset signal RST, and the output end thereof is coupled to the latch 504. The latch 504 has an enable end EN, a latch input end D2, and a latch output end Q2. Herein, the enable end EN of the latch 504 is coupled to the output end of the third inverter 502, and the latch input end D2 is coupled to the flip-flop output end Q1. Furthermore, the latch output end Q2 is coupled to the positive end of the LED 218 through a resistor 506.

Referring to FIG. 2, FIG. 3, and FIG. 5, when the CPU 202 switches the memory error signal CATERR to the second level, the CPU 202 also switches the reset signal RST from a third level to a fourth level to restart the computer apparatus 200. In the present embodiment, the third level is higher than the fourth level. If the CPU 202 switches the reset signal RST to the fourth level at time t3, the output end of the third inverter 502 is switched to the high voltage level at this time, thereby enabling the latch 504. Accordingly, the latch 504 can output the state of the flip-flop output end Q1 from the latch output end Q2 to turn on the LED 218. Therefore, when finding that the LED 218 is turned on, the operator can know that something happens to the memory 204.

In another condition, if the memory error signal CATERR switched to the second level is not due to the memory 204, but the reset signal RST is first switched to the fourth level due to other issues, so that the computer apparatus 200 is restarted, thereby pulling the memory error signal CATERR down to the second level, before the signal extracting circuit 212 has not outputted the pulse signal yet, the flip-flop 214 sets the flip-flop output end Q1 to the low voltage level due to the reset signal RST pulled down to the fourth level. Furthermore, the latch 504 is also pulled down to the fourth level due to the reset signal RST, and the state of the flip-flop output end Q1 is outputted from the latch output end Q2, thereby latching the positive end of the LED 218 at the low voltage level. At this time, even if the signal extracting circuit 212 outputs the pulse signal later, so that the flip-flop 214 sets the flip-flop output end Q1 to the high voltage level, the latch 504 is not triggered again. Accordingly, the state of the positive end of the LED 218 can not be changed. In other word, the LED 218 can not be turned on.

To sum up, in the embodiment of the invention, it is clearly shown that the memory error signal is generated due to the error of the memory or pulled down to the low voltage level due to the computer apparatus restarted. Accordingly, the embodiment of the invention provides an exact detecting result to the operator for debugging the computer apparatus.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A memory error signal detecting system, comprising:
    a signal extracting circuit receiving a memory error signal to output a pulse signal when the memory error signal switches from a first level to a second level;
    a flip-flop having a preset end, a clear end, and a flip-flop output end, wherein the preset end is coupled to an output end of the signal extracting circuit so that when the preset end receives the pulse signal, and a maintaining time of the pulse signal is maintained for a predetermine time, the flip-flop output end is set to a high voltage level, and the clear end receives a reset signal;
    a latch circuit coupled to the flip-flop output end and determining whether to output a state of the flip-flop output according to the reset signal; and
    a light sign coupled to the latch circuit and operating according to a state of an output end of the latch circuit.

2. The memory error signal detecting system as claimed in claim 1, wherein the signal extracting circuit comprises:
    a first inverter receiving the memory error signal;
    a second inverter having an input end coupled to an output end of the first inverter;
    a resistor having a first end coupled to an output end of the second inverter;
    a capacitor having a first end coupled to a second end of the resistor, and a second end of the capacitor is grounded; and
    an AND gate having a first input end and a second input respectively coupled to an output end of the first inverter and the second end of the resistor, and an output end of the AND gate coupled to the preset end.

3. The memory error signal detecting system as claimed in claim 1, wherein the flip-flop is a D flip-flop.

4. The memory error signal detecting system as claimed in claim 1, wherein the flip-flop sets the flip-flop output end to a low voltage level when a voltage level of the reset signal is low.

5. The memory error signal detecting system as claimed in claim 1, wherein the latch circuit comprises:
    a third inverter receiving the reset signal to invert the reset signal and outputting the reset signal which has been inverted; and
    a latch having an enable end, a latch input end, and a latch output end, wherein the enable end is coupled to an output end of the third inverter, the latch input end is coupled to the flip-flop output end, and the latch output end is coupled to the light sign,
    wherein when the voltage level of the inverted reset signal is high, the latch outputs the state of the flip-flop output from the latch output end to the light sign.

6. The memory error signal detecting system as claimed in claim 1, wherein the light sign is a light emitting diode (LED) having a positive end and a negative end, the positive end is coupled to an output of the latch circuit, and the negative end is grounded.

7. A computer apparatus, comprising:
    a memory;
    a central processing unit (CPU) coupled to the memory, and when accessing data stored in the memory, and finding that accumulated times of uncorrected memory errors achieve a predetermined value, the CPU switching a memory error signal from a first level to a second level, and switching a reset signal from a third level to a fourth level to restart the computer apparatus;
    a signal extracting circuit coupled to the CPU and receiving the memory error signal to output a pulse signal when the memory error signal switches from the first level to the second level;
    a flip-flop having a preset end, a clear end, and a flip-flop output end, wherein the preset end is coupled to an output end of the signal extracting circuit so that when the preset end receives the pulse signal, and a maintaining time of the pulse signal is maintained for a predetermine time, the flip-flop output end is set to a high voltage level, and the clear end receives a reset signal;
    a latch circuit coupled to the flip-flop output end and outputting a state of the flip-flop output end when the reset signal switches from the third level to the fourth level; and
    a light sign coupled to the latch circuit and operating according to a state of an output end of the latch circuit.

8. The computer apparatus as claimed in claim 7, wherein the signal extracting circuit comprises:
    a first inverter coupled to the CPU to receives the memory error signal;

a second inverter having an input end coupled to an output end of the first inverter;

a resistor having a first end coupled to an output end of the second inverter;

a capacitor having a first end coupled to a second end of the resistor, and a second end of the capacitor is grounded; and an AND gate having a first input end and a second input respectively coupled to an output end of the first inverter and the second end of the resistor, and an output end of the AND gate coupled to the preset end.

9. The computer apparatus as claimed in claim 7, wherein the flip-flop is a D flip-flop.

10. The computer apparatus as claimed in claim 7, wherein the flip-flop sets the flip-flop output end to a low voltage level when a voltage level of the reset signal is the fourth level, wherein the fourth level is lower than the third level.

11. The computer apparatus as claimed in claim 7, wherein the latch circuit comprises:

a third inverter receiving the reset signal to invert the reset signal and outputting the reset signal which has been inverted; and a latch having an enable end, a latch input end, and a latch output end, wherein the enable end is coupled to an output end of the third inverter, the latch input end is coupled to the flip-flop output end, and the latch output end is coupled to the light sign, wherein when the voltage level of the inverted reset signal is the third level, the latch outputs the state of the flip-flop output from the latch output end to the light sign.

12. The computer apparatus as claimed in claim 7, wherein the light sign is a light emitting diode (LED) having a positive end and a negative end, the positive end is coupled to an output of the latch circuit, and the negative end is grounded.

13. A memory error signal detecting system, comprising:

a first inverter receiving a memory error signal;

a second inverter having an input end coupled to an output end of the first inverter;

a resistor having a first end coupled to an output end of the second inverter;

a capacitor having a first end coupled to a second end of the resistor, and a second end of the capacitor is grounded; and an AND gate having a first input end and a second input respectively coupled to an output end of the first inverter and the second end of the resistor;

a flip-flop having a preset end, a clear end, and a flip-flop output end, wherein the preset end is coupled to an output end of the AND gate so that when the preset end receives a pulse signal, and a maintaining time of the pulse signal is maintained for a predetermine time, the flip-flop output end is set to a high voltage level, and the clear end receives a reset signal;

a latch circuit coupled to the flip-flop output end and determining whether to output a state of the flip-flop output according to the reset signal; and a light sign coupled to the latch circuit and operating according to a state of an output end of the latch circuit, wherein the latch circuit comprises:

a third inverter receiving the reset signal to invert the reset signal and outputting the reset signal which has been inverted; and a latch having an enable end, a latch input end, and a latch output end, wherein the enable end is coupled to an output end of the third inverter, the latch input end is coupled to the flip-flop output end, and the latch output end is coupled to the light sign, wherein when the voltage level of the inverted reset signal is high, the latch outputs the state of the flip-flop output from the latch output end to the light sign.

* * * * *